United States Patent [19]
McRoberts et al.

[11] Patent Number: 5,420,853
[45] Date of Patent: May 30, 1995

[54] SELF CONTROLLING CROSSBAR SWITCH AND METHOD

[75] Inventors: Louis A. McRoberts, Scottsdale; Kenneth J. Clauss, Chandler, both of Ariz.

[73] Assignee: Motorola, Inc., Schaumburg, Ill.

[21] Appl. No.: 43,129

[22] Filed: Apr. 5, 1993

[51] Int. Cl.⁶ .................. H04J 3/02; H04Q 11/04
[52] U.S. Cl. .................. 370/58.1; 370/61; 370/85.2; 370/100.1; 340/825.5
[58] Field of Search .......... 370/24, 29, 54, 58.1, 370/60, 60.1, 61, 85.1, 85.2, 85.6, 94.1, 58.2; 340/825.03, 825.06, 825.15, 825.5, 825.51, 825.79, 825.85, 825.86, 825.87, 825.89; 375/7, 106, 108, 118, 119, 120

[56] References Cited

U.S. PATENT DOCUMENTS

| | | | |
|---|---|---|---|
| 4,626,843 | 12/1986 | Szeto et al. | 340/825.5 |
| 4,628,311 | 12/1986 | Milling | 340/825.5 |
| 4,639,861 | 1/1987 | Appiano et al. | 364/200 |
| 4,887,266 | 12/1989 | Neve et al. | 370/95.1 |
| 4,897,833 | 1/1990 | Kent et al. | 370/85.2 |
| 4,993,025 | 2/1991 | Vesel | 370/94.1 |
| 5,070,499 | 12/1991 | Maher et al. | 370/61 |
| 5,128,931 | 7/1992 | Yamanaka et al. | 370/61 |
| 5,179,669 | 1/1993 | Peters | 370/58.2 |
| 5,247,514 | 9/1993 | Matsuda et al. | 370/61 |

*Primary Examiner*—Alpus Hsu
*Attorney, Agent, or Firm*—Frederick M. Fliegel

[57] ABSTRACT

A method and apparatus for switching data between a selected pair of data processing elements. The method involves steps of sending a first service request signal from a first data processing element to a switch, where the first service request signal includes a first destination, sending a first data message to the switch and storing the first service request signal and the first data message at least temporarily in a first buffer memory. The method further involves steps of routing the first data message to the first destination and initiating communication between the first data processing element and the first destination.

19 Claims, 7 Drawing Sheets

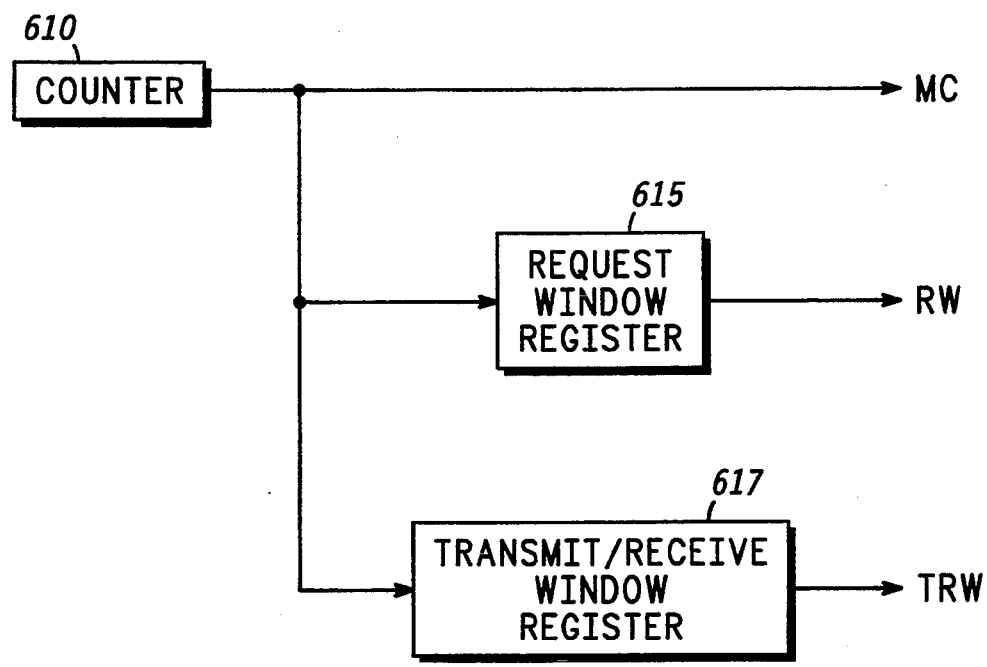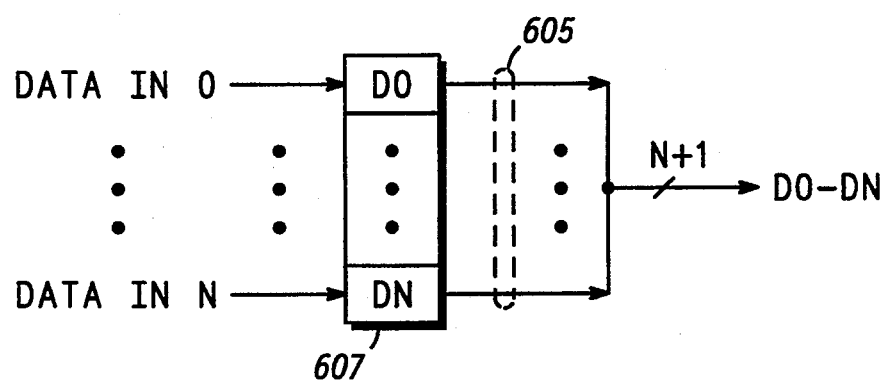
FIG. 6

SELF CONTROLLING CROSSBAR SWITCH AND METHOD

FIELD OF THE INVENTION

This invention relates in general to the field of high speed data communication, in particular to transfer of data between a plurality of devices (e.g., computers, digital communications networks) and more particularly to rapid, full duplex data transfer between devices by a self-controlling crossbar switch.

BACKGROUND OF THE INVENTION

Data switching between devices is important for many electronic products which require a plurality of data processors.

Some systems supply data to a plurality of devices but only enable one of them to receive data. Alternatively, data are routed serially through all destinations until a given node recognizes its address in the data header, as described, for example, in U.S. Pat. No. 4,993,025, J. Vesel et al., "High Efficiency Image Data Transfer Network" (Feb. 12, 1991). Such systems suffer from lack of speed because data are handled by a number of nodes in sequence.

Techniques for realizing crossbar switches generally utilize programs stored in random access memory to implement switching decisions and also arbitration in light of plural requests and generally are not able to store a series of data to be switched.

A significant drawback of such approaches has been a limitation on the number of requests which can be simultaneously accommodated, especially requests to supply data to the same node.

What are needed are methods and apparatus for rapidly switching synchronous data interconnections between several data processing/communicating elements.

SUMMARY OF THE INVENTION

Accordingly, there is provided a new and improved apparatus for switchably coupling data between a selected pair of L many data processing elements. The apparatus includes a first data input/output port coupled to a first data processing element. The first data input/output port includes a first buffer memory. The first data input/output port accepts input data and provides output data. The apparatus includes a second data input/output port coupled to a second data processing element. The second data input/output port includes a second buffer memory. The second data input/output port accepts input data and provides output data. The apparatus further includes a control logic block for providing control and timing signals and L many request logic blocks coupled to the control logic block and to the first and second data input/output ports. The request logic blocks receive data transmission requests coupled from the data processing elements and respond by providing data transmission coordination signals. The apparatus also includes L many arbitration logic blocks coupled to the L many request logic blocks and to the control logic block. The arbitration logic blocks provide sequencing commands for sequencing data transmission requests in response to the data transmission coordination signals. The apparatus also includes L many transmit logic blocks coupled to each of the first and second data input/output ports, to the control logic block and to the L many arbitration logic blocks. The transmit logic blocks transmit output data to and from the first and second data input/output ports in response to the data transmission requests and sequencing commands from the L many arbitration logic blocks.

Accordingly, it is an advantage of the present invention that an improved method for coupling a plurality of data processing elements is provided. The method involves steps of beginning a switching cycle at a first clock count, counting by a first counter, a master count beginning at the first clock count, opening a transmit/receive window when the master count reaches a first count, opening a request window when the master count reaches the first count, reading a request over a first interval, accepting input data beginning when the master count reaches a second count, delaying the input data a first number of clock counts, clocking the input data out of the crossbar switch after the first number of clock counts and ending a switching cycle after a second number of clock cycles.

The present invention further provides a method for switchably coupling data between a selected pair of data processing elements. The method involves steps of initiating a switching cycle, sending a first service request signal from a first data processing element to a switch, wherein the first service request signal includes a first destination, sending a first data message to the switch and storing the first service request signal and the first data message at least temporarily in a first buffer memory. The method further comprises steps of routing the first data message to the first destination, communicating between the first data processing element and the first destination and ending the switching cycle.

The routing step further desirably but not essentially involves steps of determining when the first destination is communicating, and then: signaling the first buffer memory to continue to store the first service request signal and the first data message, waiting until the first destination is no longer communicating and then proceeding to the initiating step; and, when the first destination is not communicating, proceeding to the initiating step.

BRIEF DESCRIPTION OF THE DRAWING

The invention is pointed out with particularity in the appended claims. However, a more complete understanding of the present invention may be derived by referring to the detailed description and claims when considered in connection with the figures, wherein like reference numbers refer to similar items throughout the figures, and:

FIG. 6 is a block diagram of the control and timing logic block of FIG. 2 in accordance with the present invention.

DETAILED DESCRIPTION OF THE DRAWING

Data links are described, for example, in U.S. Pat. No. 4,639,861, S. Appiano et al., "Interface Controlling BiDirectional Data Transfer Between A Synchronous and An Asynchronous Bus" (Jan. 27, 1987) and U.S. Pat. No. 4,887,266, B. Neve et al., "Communication System" (Dec. 12, 1989), which patents are hereby incorporated herein by reference.

The terms "clock cycle" and "bit interval" are used interchangeably herein to represent the time interval over which a given datum is valid.

Figure 1:
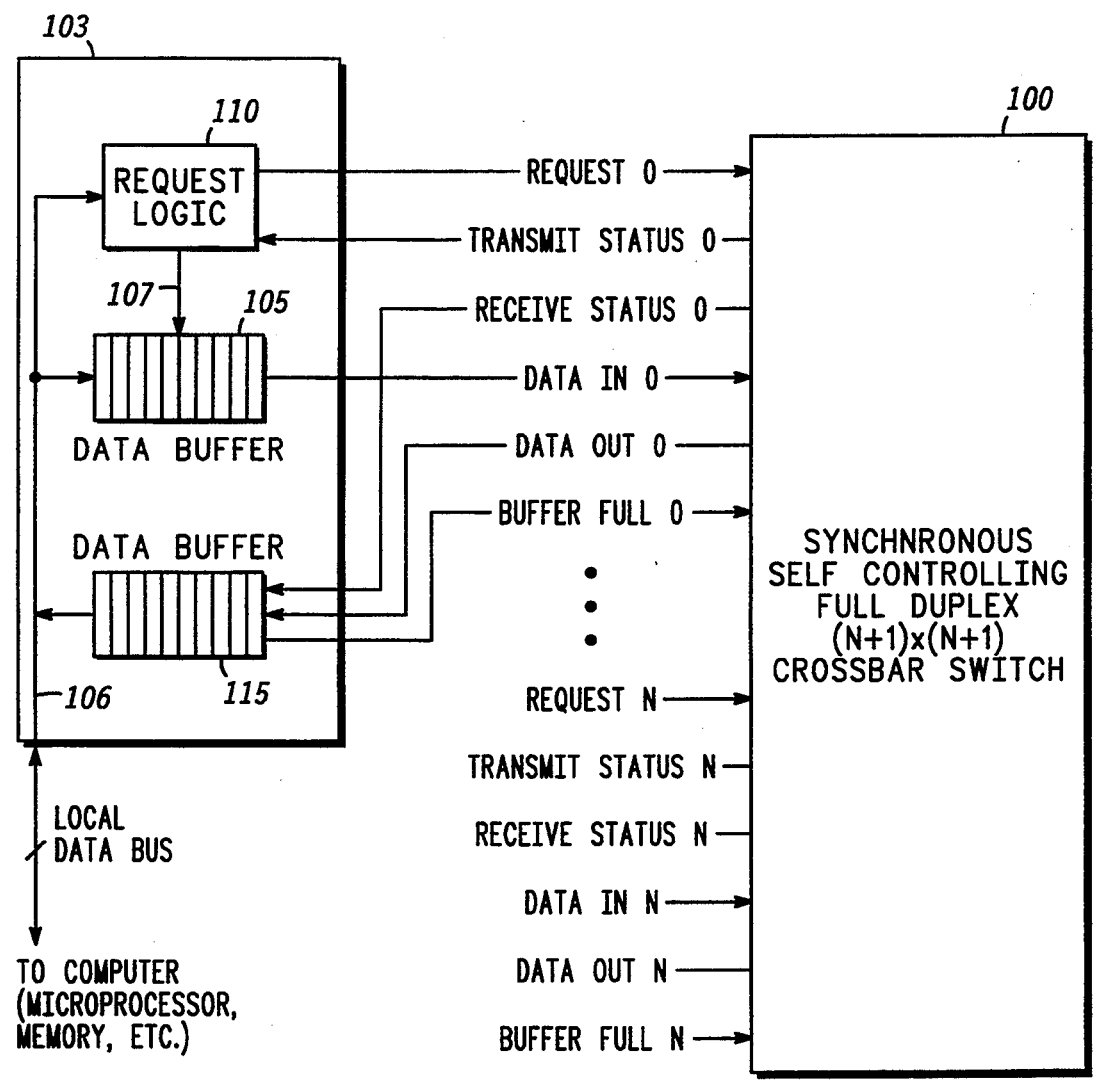
FIG. 1 is a simplified block diagram of a crossbar switch in accordance with the present invention.

FIG. 1 is a simplified block diagram of (N+1)×(N+1) switch 100 in accordance with the present invention. Switch 100 has inputs coupled to lines REQUEST 0 . . . REQUEST N, DATA IN 0 . . . DATA IN N and BUFFER FULL 0 . . . BUFFER FULL N and has outputs coupled to lines TRANSMIT STATUS 0 . . . TRANSMIT STATUS N, RECEIVE STATUS 0 . . . RECEIVE STATUS N, and DATA OUT 0 . . . DATA OUT N, each comprising a serial synchronous digital data line. In one embodiment, switch 100 conveniently has eight channels, i.e., is an 8×8 switch, and has capability for switching eight full duplex serial data lines (i.e., N=7).

Switch 100 couples at least one device (e.g., computer, digital data communications device, etc., not shown) to another device (e.g., computer, digital data communications device, etc., not shown), e.g., line DATA IN 0 may be coupled to line DATA OUT N (and, correspondingly, line DATA IN I may be coupled to line DATA OUT J, where I, J may or may not correspond to N and/or 0), for each of a plurality of inputs to each of a plurality of outputs, provided that no conflicts (two or more inputs desiring to be coupled to the same output, for example) arise.

For example, while line DATA IN 0 is coupled to line DATA OUT N (line DATA IN N may or may not be coupled to line DATA OUT 0), line DATA IN I may be coupled to line DATA OUT J and line DATA IN J may be coupled to line DATA OUT 0. Similarly, other distinct data lines may additionally be coupled together simultaneously, provided that no output line is desired by more than one input data line.

Switch 100 desirably includes buffer memory 103 for each input/output port, e.g., each group of inputs associated with lines REQUEST 0, DATA IN 0 and BUFFER FULL 0 and outputs associated with lines TRANSMIT STATUS 0, RECEIVE STATUS 0 and DATA OUT 0. Buffer memory 103 comprises data buffer 105 having a parallel input coupled to bus 106 and a serial output coupled to line DATA IN 0. Data buffer 105 desirably comprises a parallel to serial converter and a buffer memory.

Buffer memory 103 further includes request logic 110 having an input coupled to line TRANSMIT STATUS 0, for example, an input coupled to bus 106, an output coupled to data buffer 105 via line 107 for toggling data buffer 105 to store data arriving via bus 106 or to store data arriving via bus 106 and to transmit data via line DATA IN. Request logic 110 toggles buffer memory 103 in response to signals coupled via bus 106 and line TRANSMIT STATUS.

Buffer memory 103 further comprises data buffer 115, having inputs coupled to lines DATA OUT and RECEIVE STATUS and having outputs coupled to bus 106 and line BUFFER FULL. Data buffer 115 accepts serial data coupled via line DATA OUT, converts serial data to parallel data, stores the data and supplies the data in parallel form to bus 106 in response to signals coupled via line RECEIVE STATUS. When data buffer 115 is full and cannot accept further input data, output line BUFFER FULL is asserted. Switch 100 desirably includes a buffer memory such as buffer memory 103 at each of inputs 0 . . . N, however, only one such buffer memory is illustrated in FIG. 1 for convenience of illustration and ease of understanding.

Figure 2:
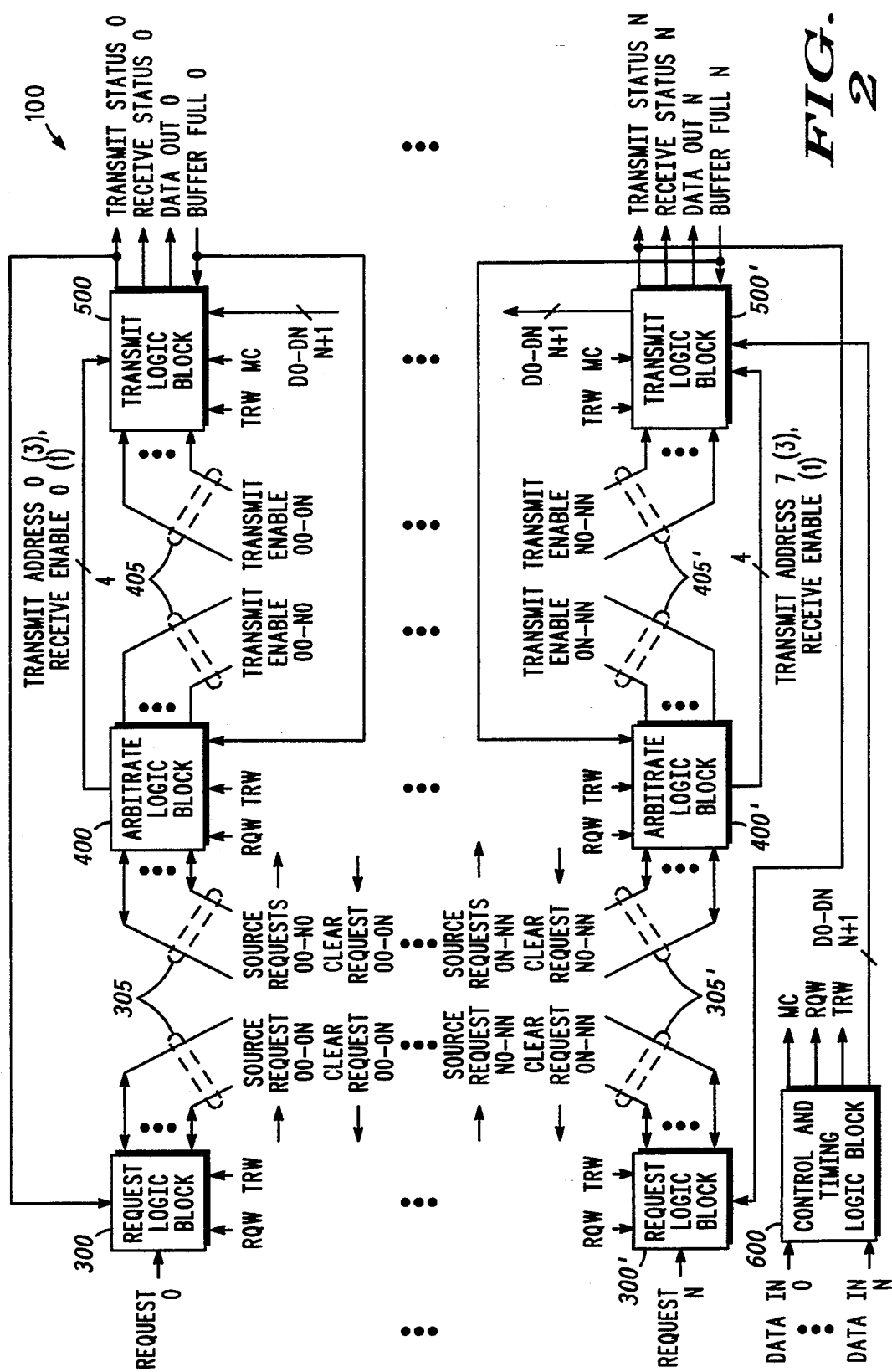
FIG. 2 is a simplified schematic diagram of a crossbar switch in accordance with the present invention.

FIG. 2 is a simplified schematic diagram of crossbar switch 100 in accordance with the present invention. Crossbar switch 100 comprises request logic blocks 300 . . . 300' having bidirectional buses 305 . . . 305' coupled thereto, arbitrate logic blocks 400 . . . 400' coupled to buses 305 . . . 305' and coupled by transmit enable buses 405 . . . 405' to transmit logic blocks 500 . . . 500'.

Request logic blocks 300 . . . 300' and arbitrate logic blocks 400 . . . 400' have inputs coupled to lines RW (i.e., request window) and TRW (i.e., transmit/receive window).

Transmit logic blocks 500 . . . 500' have outputs coupled to lines TRANSMIT STATUS 0 . . . N, RECEIVE STATUS 0 . . . N and DATA OUT 0 . . . N and inputs coupled to lines BUFFER FULL 0 . . . N. Transmit logic blocks 500 . . . 500' have inputs coupled to line TRW and bus MC (i.e., master count) and are coupled via data bus 605 to control and timing logic block 600. Control and timing logic block 600 has inputs coupled to lines DATA IN 0 . . . N and has outputs coupled to lines D0 . . . DN, RW and TRW and to bus MC.

Figure 3:
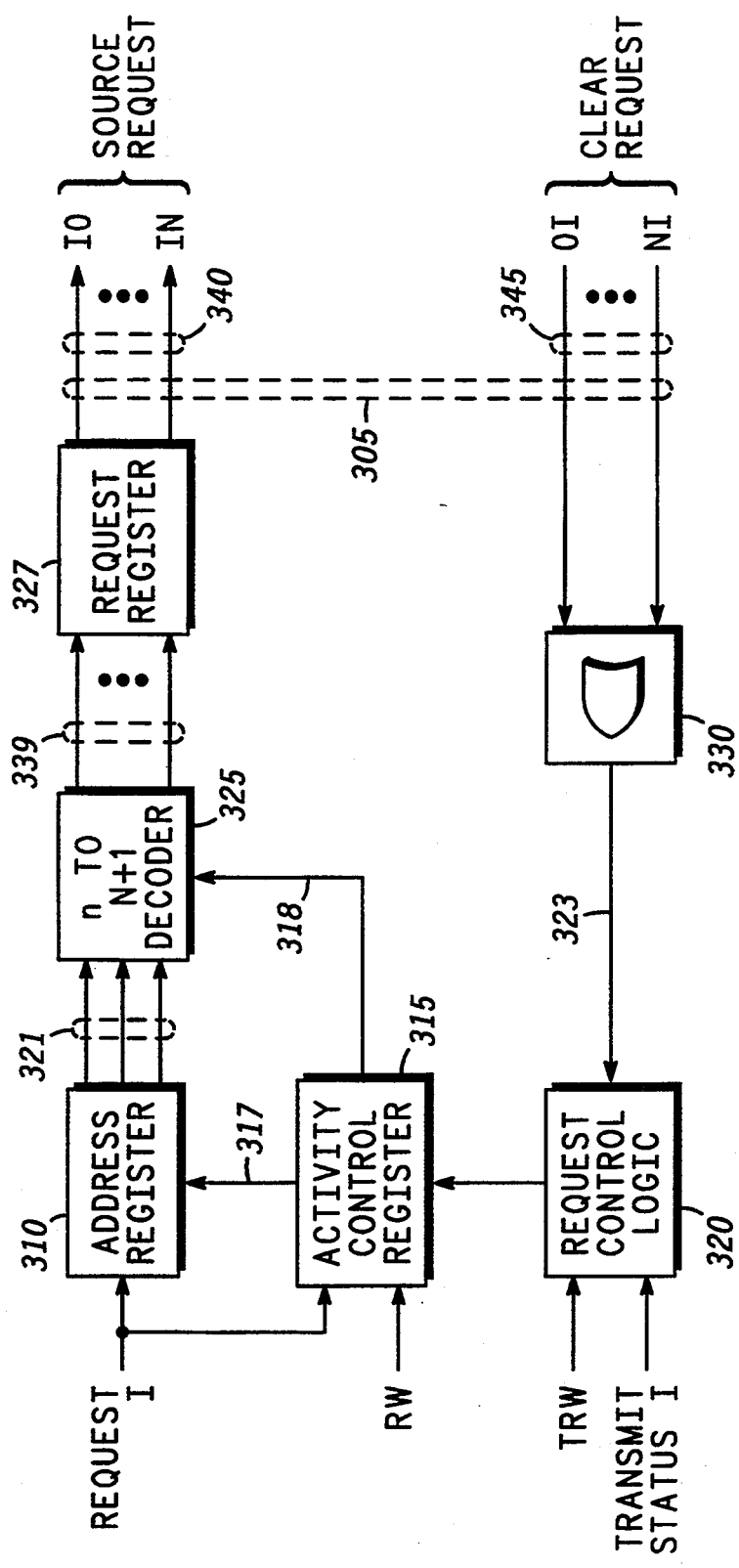
FIG. 3 is a block diagram of the request logic block of FIG. 2 in accordance with the present invention.

FIG. 3 is a block diagram of request logic block 300 (FIGS. 2, 3) in accordance with the present invention. Request logic block 300 (FIG. 3) is the $I^{th}$ of N+1 such blocks utilized by switch 100 (FIGS. 1, 2), where N+1 corresponds to the number of distinct data processing-/communicating elements (e.g, computers, digital communication links, etc.) coupled to and transferring data through switch 100. Request logic block 300 has input line REQUEST I coupled to address register 310 and to activity control register 315.

A request is conveniently presented via input REQUEST I as a five bit request word, for example. In this example, the first bit is a start bit (e.g., logic "1"), the second through fourth bits comprise a (n=) 3 bit destination address (i.e., $2^n = N+1$) and the fifth bit is a stop bit (e.g., logic "0").

The start bit signals activity control register 315 to flag address register 310 via line 317, allowing the subsequent address data to be latched in address register 310.

The stop bit flags activity control register 315 to signal address register 310 (via line 317) to present address bits to decoder 325 on bus 321 and decoder 325 to decode address data coupled via bus 321 and to latch decode request(s) via bus 339 into request register 327 which then will assert one of N+1 SOURCE REQUEST lines I0 . . . IN comprising bus 340.

The two character designations (e.g., IN, bus 40) refer to the transmission source (I) and receiver destination (N) corresponding to data to be transmitted and/or received. Each line of bus 340 couples signals to a corresponding arbitration logic block 400 (FIG. 1), signifying which transmission source is permitted to transmit data to the address word-specified destination.

Request logic block 300 also has inputs coupled to lines TRW and TRANSMIT STATUS I coupled to request control logic 320. Request control logic 320 is coupled via line 323 to block 330 having inputs CLEAR REQUEST 0I . . . NI (bus 345), for example. Buses 340, 345 together comprise bus 305 (FIGS. 1-3). Block 330 is conveniently realized as an OR gate, for example, and signals request control logic 320 in the event that any of lines CLEAR REQUEST 0I . . . NI (bus 345) are asserted (e.g., logic "1"). Data are transmitted during the transmit/receive window (i.e., when line TRW is asserted).

When a request has been identified and then arbitrated by arbitration logic block 400, a signal is coupled via bus 345 to clear request control logic block 320 and request register 327 via line 323 and switch 100 is ready to process a new request (add) . . . (request), if one of buffer memories 103 (FIG. 1) is able to send a new request.

Figure 4:
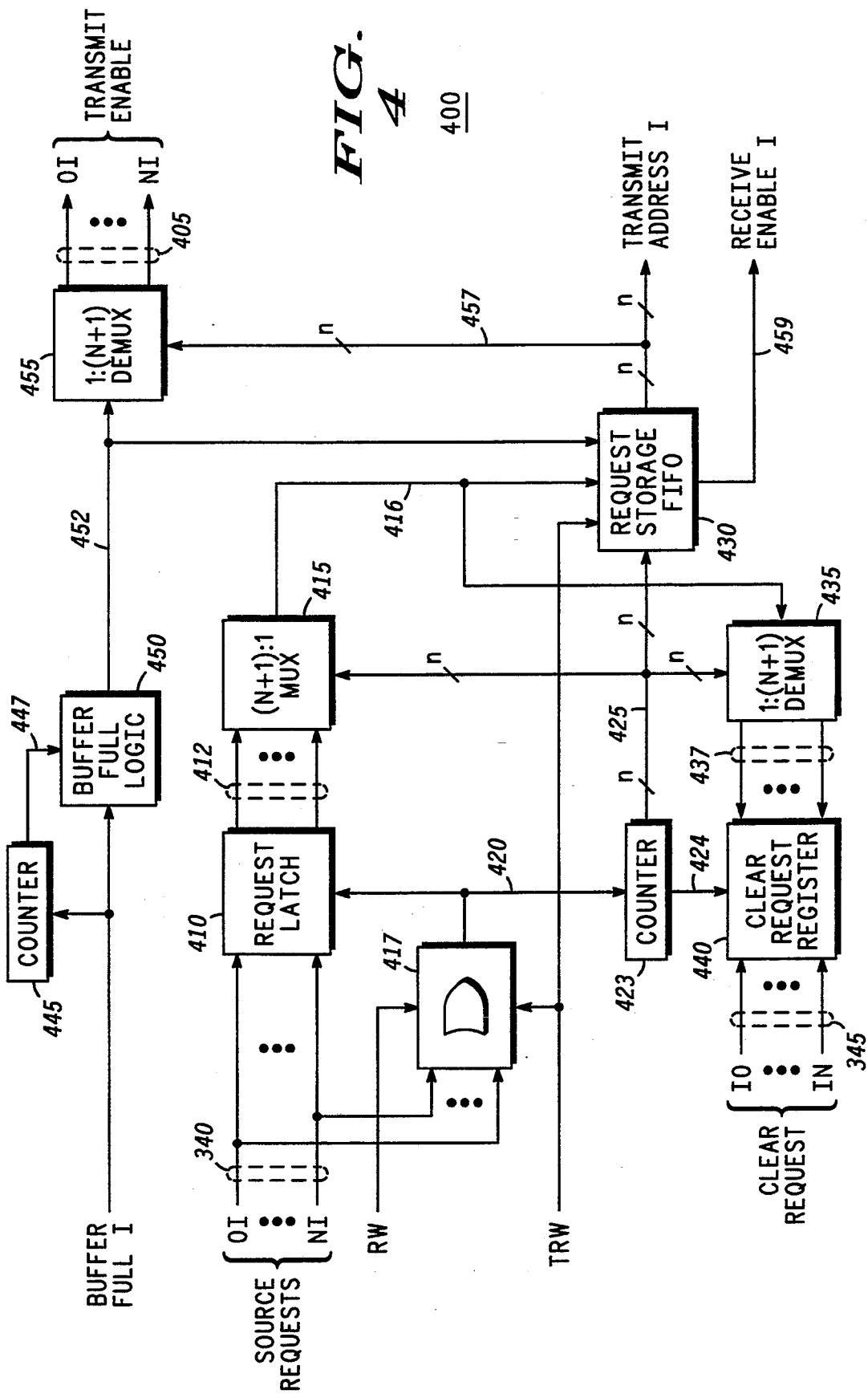
FIG. 4 is a block diagram of the arbitration logic block of FIG. 2 in accordance with the present invention.

FIG. 4 is a block diagram of arbitration logic block 400 (FIG. 2) in accordance with the present invention. Arbitration logic block 400 comprises request latch 410 having inputs coupled to bus 340 and outputs coupled to bus 412 and is toggled via signals coupled by line 420. These signals indicate that one or more of the SOURCE REQUEST lines (bus 340) is asserted and that a request window and a transmit receive window have occurred, which conditions are assessed by block 417. Counter 423 counts signals on line 420 and provides a (e.g., 3 bit) address on bus 425, allowing each of the lines comprising source request bus 340 to be serviced in turn, and to latch the corresponding line in clear request register 440 in response to a signal coupled via line 424.

Bus 412 is coupled to inputs of multiplexer (MUX) 415. MUX 415 is desirably an N+1:1 multiplexing device (i.e., couples one of N+1 inputs to a single output) and has N+1 data inputs coupled to bus 425, n address inputs coupled to bus 425 and has an output coupled to line 416. MUX 415 couples one of the data input lines (bus 412) specified by address data on bus 425 to the output associated with line 416. Line 416 is coupled to request storage FIFO 430 and demultiplexer (DMUX) 435. DMUX 435 is desirably a 1:N+1 demultiplexing device and has n many address inputs coupled to bus 425 and N+1 data outputs coupled to bus 437 and couples signals from line 416 to that line of bus 437 specified by address data (bus 425). Bus 425 is coupled to inputs of clear request buffer 440. Clear request buffer 440 has outputs coupled to bus 345.

Arbitration logic block 400 thus responds to (and latches in request latch 410) input source requests when any of lines SOURCE REQUEST 0I . . . NI comprising bus 340 are asserted, in response to signals coupled via line 420 from block 417. Counter 423 directs MUX 415 to observe each of lines SOURCE REQUEST 0I . . . NI in turn and when one of lines 0I . . . NI is asserted, a count value (counter 423, corresponding to the source address where the request originated) is stored in request storage FIFO 430.

When plural addresses are observed, these are stored sequentially. Counter 423 is reset after cycling through all addresses and also clears request register 440 to prepare for new incoming data signals. This process repeats throughout the switch cycle, following which the transmit address, receive enable and transmit enable signals are sent to transmit logic block 500 via lines TRANSMIT ADDRESS I, RECEIVE ENABLE I and TRANSMIT ENABLE 0I . . . NI, respectively, to configure switch 100 for the next switch cycle.

When line BUFFER FULL I is asserted, counter 445 counts switch cycles and when line BUFFER FULL I is cleared prior to a count from counter 445 reaching a predetermined number, the current request is granted and counter 445 is reset.

Alternatively, when line BUFFER FULL I is not cleared prior to the count from counter 445 reaching the predetermined number, the request is granted to transmit but not to receive, i.e., data are transmitted to switch 100 but not to the buffer which is sending the buffer full signal. This arrangement avoids a potential lockup condition which could result, for example, if every channel requests transmission to a destination having a full interface buffer (i.e., data buffer 115, FIG. 1).

These alternatives are effected by counter 445, buffer full logic 450, request storage FIFO 430 and DMUX 455 as follows. Counter 445 is coupled to buffer full logic 450 via line 447. Buffer full logic 450 is also coupled to line BUFFER FULL I and is also coupled via line 452 to 1:N+1 DMUX 455 and to request storage FIFO 430. DMUX 455 has n address inputs coupled to bus 457 associated with TRANSMIT ADDRESS I and has N outputs coupled to lines TRANSMIT ENABLE 0I . . . NI forming bus 405, for example. DMUX 455 decodes a transmit address from request storage FIFO 430 and asserts the appropriate one of lines TRANSMIT ENABLE 0I . . . , NI when signaled to do so by buffer full logic 450 via line 452.

Figure 5:
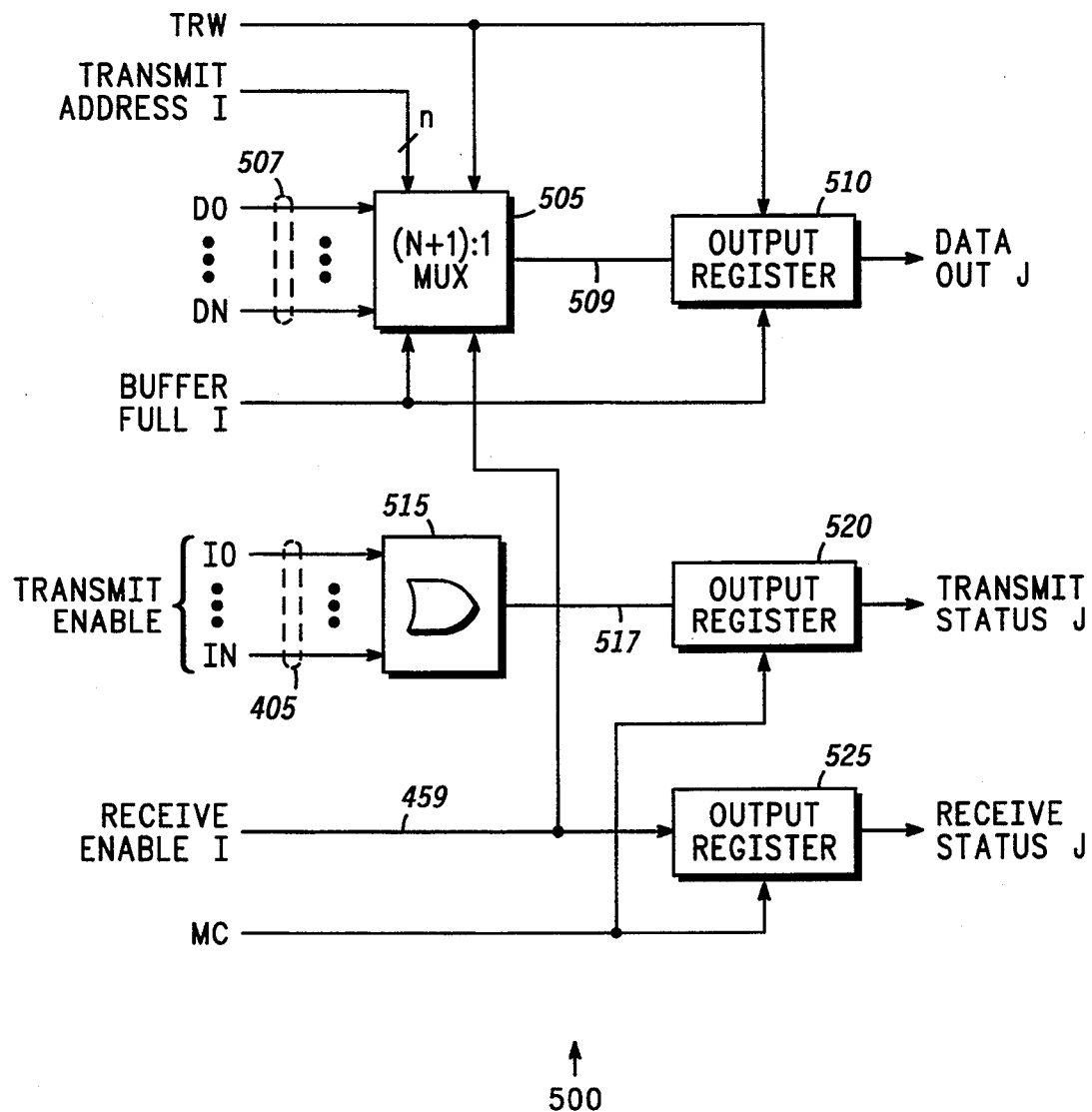
FIG. 5 is a block diagram of the transmit logic block of FIG. 2 in accordance with the present invention.

FIG. 5 is a block diagram of transmit logic block 500 of FIG. 2 in accordance with the present invention. Transmit logic block 500 comprises MUX 505 having inputs coupled to lines TRW, BUFFER FULL I, RECEIVE ENABLE I, TRANSMIT ADDRESS I and data bus 507 comprising data lines D0 . . . DN. MUX 505 is desirably an N+1:1 multiplexing device and couples one of data lines D0 . . . DN to output register 510 via line 509 in response to timing and control signals coupled via lines TRW, BUFFER FULL I, RECEIVE ENABLE I and bus TRANSMIT ADDRESS I. Data are then coupled to line DATA OUT J from output register 510 in response to signals coupled via lines TRw and BUFFER FULL I.

Block 515 has inputs coupled to lines TRANSMIT ENABLE I0 . . . IN and has an output coupled to line 517. Block 515 is conveniently realized as an OR gate, for example, and signals output register 520 in the event that any of lines TRANSMIT ENABLE I0 . . . IN (bus 405) are asserted (e.g., logic "1"). Line 517 is coupled to an input of output register 520 having an output coupled to line TRANSMIT STATUS J. Line RECEIVE STATUS J is coupled to an output of output register 525. Output register 525 has inputs coupled to line RECEIVE ENABLE I and bus MC.

Transmit logic block 500 thus selects which line of bus 507 to couple to line DATA OUT J in response to address information provided via bus TRANSMIT ADDRESS I when line TRW is asserted and when line BUFFER FULL I is not asserted and also sets flags on (asserts) lines TRANSMIT STATUS J and RECEIVE STATUS J to signal data communication status to other portions of switch 100.

FIG. 6 is a block diagram of control and timing logic block 600 of FIG. 2 in accordance with the present invention. Control and timing logic block 600 comprises input registers 607 having inputs DATA IN 0 . . . N and outputs D0 . . . DN and further comprises counter 610 having output on bus MC. The count associated with bus MC clocks request window register 615 to provide a request window signal on line RW and also clocks transmit/receive window register 617 to provide a transmit/receive window signal on line TRW. These signals are coupled to the elements of FIGS. 2-5 to synchronize data flow as discussed hereinabove and as further detailed below with respect to FIG. 7 and Example I.

Example I

Figure 7:
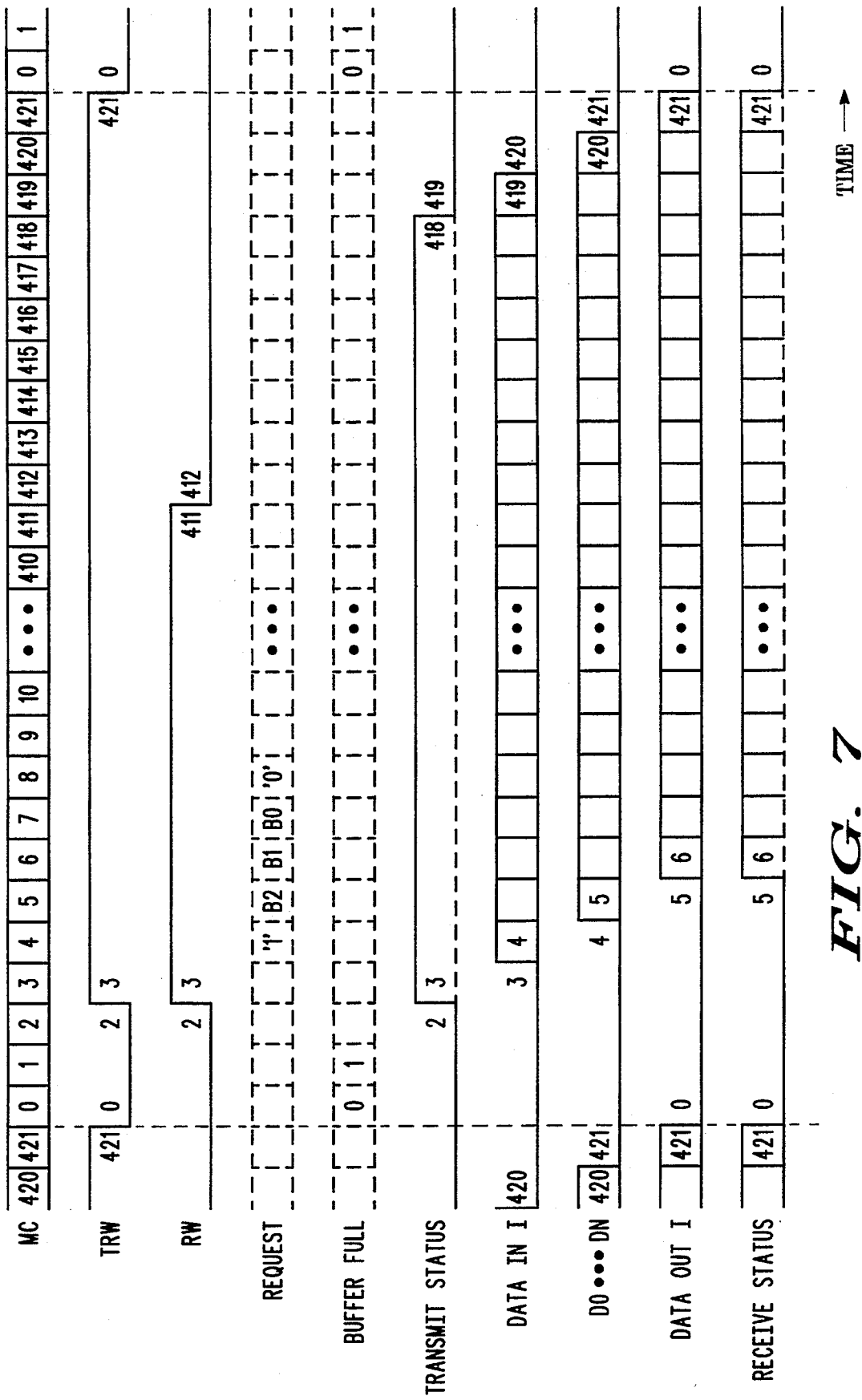
FIG. 7 is a switch timing diagram for the switch of FIG. 2 in accordance with the present invention.

FIG. 7 is a timing diagram for switch 100 of FIGS. 1, 2 in accordance with the present invention. Top trace MC describes master count signals on bus MC versus time for a full switch cycle. Trace TRW describes transmit/receive window signals associated with line TRW versus time. This signal is "low" for the first three bit intervals of a switch cycle and is "high" (the transmit/receive window is enabled) for the remainder of the switch cycle, 422 bit intervals in this example. The length of the switch cycle is desirably 6+P.32, where P is an integer, preferably in the range from 1 to 32. Trace RW describes receive window signals associated with line RW versus time. This signal is "low" for the first three and the last ten bit intervals of a clock cycle and is "high" (the receive window is enabled) for the remainder of the switch cycle. Trace REQUEST is arbitrary (requests may occur at any time) but typically requests will occur at the beginning of the fifth bit interval (arrow). Similarly, trace BUFFER FULL is arbitrary.

BUFFER FULL, when asserted, is asserted at the beginning of the second bit interval (arrow) and may be released at any time when data are removed from the interface. Trace TRANSMIT STATUS is asserted at the beginning of the third bit cycle and is maintained through the end of the 418$^{th}$ bit interval, for example. Trace DATA IN I is low (blocked) for the first four and the last two bit intervals and is arbitrary during the rest of the switch cycle. Trace DO . . . DN is low for the first five and the last bit intervals and is arbitrary during the rest of the switch cycle. Traces DATA OUT I and RECEIVE STATUS are low for the first six bit intervals and are arbitrary during the rest of the switch cycle. Data are thus clocked from DATA IN I to DO . . . DN to DATA OUT I with one bit interval of delay between each successive stage during the transmit/receive window.

Thus, a crossbar switch has been described which overcomes specific problems and accomplishes certain advantages relative to prior art methods and mechanisms. The improvements over known technology are significant. The expense, complexities, and large memory requirements of prior art approaches are avoided. Full duplex, synchronous data communications between arbitrary numbers of data processing elements are provided between the switch core and the input data buffer memories, and because all transmissions/receptions to/from data processing elements are independent and simultaneous, requirements for time division multiplexing are reduced or eliminated. The input buffer memories coupling data processing elements to the core of the switch provide boundaries between synchronous serial data transfers and asynchronous parallel data transfers. Timing of data transmission between data processing elements and input buffer memories is thus divorced from timing requirements of synchronous data transfer within the switch core. Input data buffer memories may be incorporated within switch 100 (FIGS. 1, 2) or within the data processing elements, allowing the data processing elements to be co-located or not as suits the requirements of a particular switching application. The buffer full line provides a capability for suspending data transfer if the input data buffer memory is full and also averts lockup if a destination data processing element has failed and is thus unable to remove received data from the buffer memory. The switch of the present invention is self controlling and includes buffer memories allowing coincident requests to be handled sequentially without discarding requests.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for switchably coupling data between a selected pair of data processing elements including a first data processing element and a first destination, said first destination comprising a second data processing element, said method comprising steps of:
    initiating a switching cycle;
    sending a first service request signal from said first data processing element to a switch including eight inputs and eight outputs, wherein any of said eight inputs may be coupled to any of the eight outputs not connected to another of the eight inputs, the first service request signal including said first destination;
    sending a first data message to the switch;
    storing the first service request signal and the first data message at least temporarily in a first buffer memory;
    opening a transmit/receive window having a predetermined duration at a predetermined interval after said initiating step, the switch being enabled to transmit/receive data when the transmit/receive window is open;
    routing the first data message to the first destination;
    communicating data between the first data processing element and the first destination while the transmit/receive window is open; and
    ending said switching cycle and closing the transmit/receive window after a predetermined number of clock cycles.

2. A method as claimed in claim 1, wherein said said initiating step includes a step of initiating full duplex communication between said first data processing element and said second data processing element.

3. A. A method as claimed in claim 1, wherein said initiating step includes steps of initiating synchronous digital communication between said first data processing element and said second data processing element.

4. A method as claimed in claim 1, wherein said routing step includes steps of:
    determining when the first destination is communicating with a data processing element different than said first data processing element;

when the first destination is communicating with a data processing element different than said first data processing element, including steps of:
    signaling the first buffer memory to continue to store the first service request signal and the first data message; and
    waiting until the first destination is no longer communicating; and prroceeding to said initiating step.

5. A method as claimed in claim 1, wherein said predetermined number of clock cycles is four hundred twenty-two (4221) clock cycles after said initiating step.

6. A method as claimed in claim 5, wherein said communicating step begins four clock cycles after said initiating step and after said routing step has occurred.

7. An apparatus for switchably coupling data between a selected pair of L data processing elements, wherein L is an integer and comprises at least eight, said apparatus comprising:
    a first data input/output port coupled to a first data processing element, said first data input/output port including a first buffer memory, said first data input/output port for accepting first input data and for providing first output data;
    a second data input/output port coupled to a second data processing element, said second data input/output port including a second buffer memory, said second data input/output port for accepting second input data and for providing second output data;
    a control logic block for providing control and timing signals;
    L request logic blocks coupled to said control logic block and coupled to said first and second data input/output ports, said request logic blocks for receiving data transmission requests from said L data processing elements and for providing data transmission coordination signals in response thereto;
    L arbitration logic blocks coupled to said request logic blocks and to said control logic block, said arbitration logic blocks for providing sequencing commands for sequencing said data transmission requests in response to said data transmission coordination signals; and
    L transmit logic blocks coupled to each of said first and second data input/output ports, to said control logic block and to said arbitration logic blocks, said transmit logic blocks for transmitting said first and second output data to said first and second data input/output ports, respectively, in response to said data transmission requests and said sequencing commands from said arbitration logic blocks.

8. An apparatus as claimed in claim 7, wherein said timing signals provided by said control logic block include a clock signal and a master count signal and wherein said control signals include a transmit/receive signal and a request window signal, said transmit/receive signal indicating when said master count signal and master count signal and said request window signal indicate when said apparatus may accept a request to accept input data.

9. An apparatus as claimed in claim 8, wherein said master count signal defines a switch cycle having a beginning and an end, wherein said beginning and said end are separated by 422 clock cycles.

10. An apparatus as claimed in claim 9, wherein said transmit/receive signal is asserted three clock cycles after said beginning and wherein said transmit/receive signal is cleared at said end.

11. An apparatus as claimed in claim 9, wherein said request window signal is asserted three clock cycles after said beginning.

12. An apparatus as claimed in claim 9, wherein said request window signal is cleared ten clock cycles prior to said end.

13. An apparatus as claimed in claim 9, wherein said first data input/output port is coupled to said second data input/output port for 416 clock cycles during said switch cycle.

14. A method for switchably coupling data between a selected pair of data processing elements by a crossbar switch, said method comprising steps of:
    beginning a switching cycle at a first clock count;
    counting by a first counter, a master count beginning at said first clock count;
    opening a transmit/receive window when said master count reaches a first count, said crossbar switch being enabled to transmit/receive data when said transmit/receive window is open;
    opening a request window when said master count reaches said first count, said crossbar switch being enabled to receive transmission requests when said request window is open;
    reading a transmission request from one of said selected pair of data processing elements over a first time interval;
    accepting input data beginning when said master count reaches a second count;
    storing said input data;
    delaying said input data a first number of clock cycles;
    clocking said input data out of said crossbar switch after said first number of clock cycles; and
    ending a switching cycle after a second number of clock cycles.

15. A method as claimed in claim 14, further comprising steps of:
    delaying said input data until a buffer full signal is cleared when said buffer full signal is asserted during the three clock cycles before said request window is opened; and
    delaying said input data two clock counts when said buffer full signal is not asserted during the three clock cycles before said request window is opened.

16. A method as claimed in claim 14, wherein said first count comprises a count of three clock cycles.

17. A method as claimed in claim 14, wherein said first number of clock cycles is two clock cycles.

18. A method as claimed in claim 14, wherein said second number of clock cycles is in a range of from 38 to 6+P·32, where P is an integer in the range from 1 to 32.

19. A method as claimed in claim 14, wherein said first count comprises a count of four clock cycles.

* * * * *